June 27, 1950  N. E. ANDERSON  2,512,706
WATER-COOLED GAS-BLANKETED ARC WELDING TORCH
Filed March 18, 1948  3 Sheets-Sheet 1
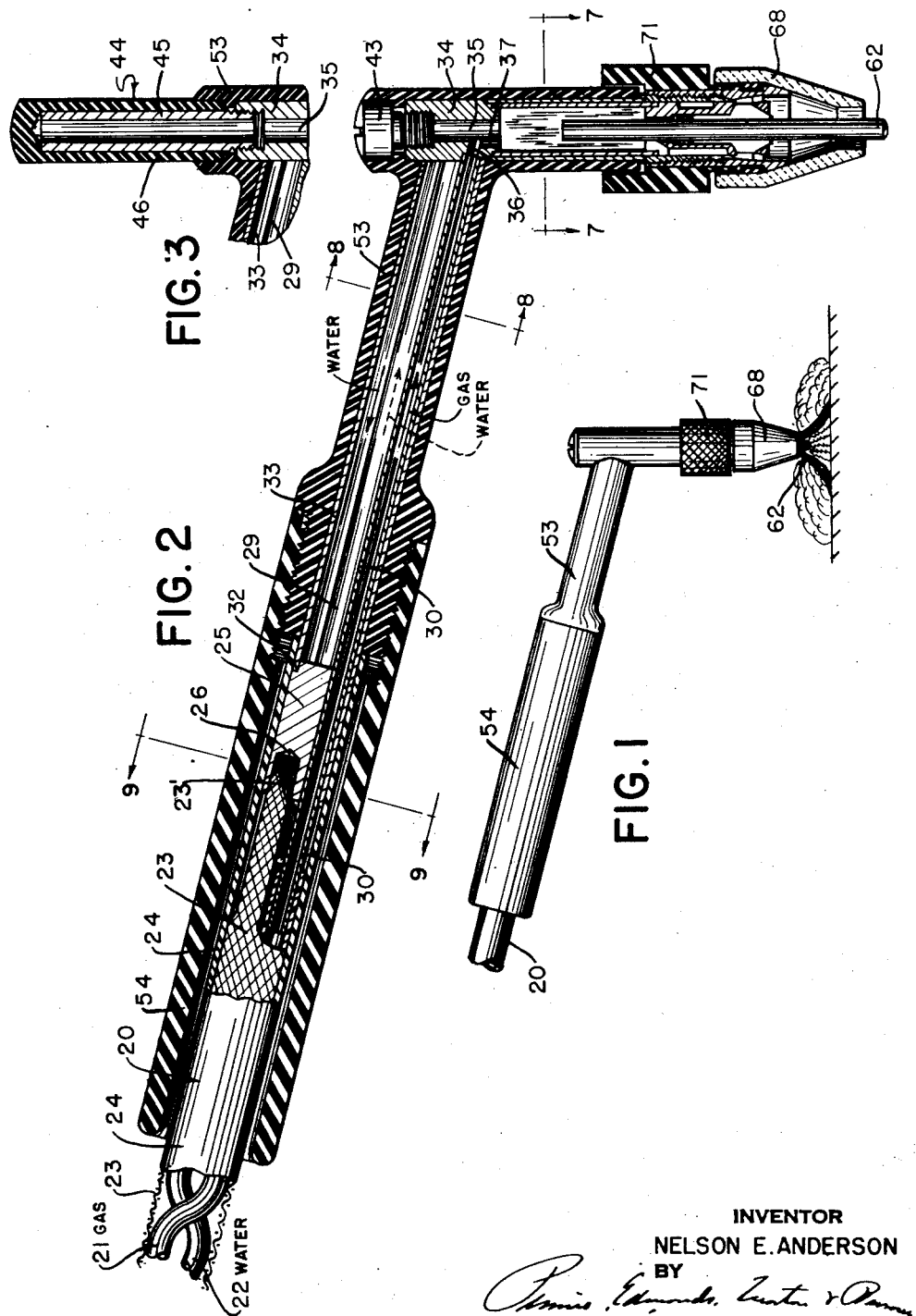
INVENTOR
NELSON E. ANDERSON
BY
ATTORNEYS

INVENTOR
NELSON E. ANDERSON
BY
ATTORNEYS

June 27, 1950  N. E. ANDERSON  2,512,706
WATER-COOLED GAS-BLANKETED ARC WELDING TORCH
Filed March 18, 1948  3 Sheets-Sheet 3

INVENTOR
NELSON E. ANDERSON
BY
ATTORNEYS

Patented June 27, 1950

2,512,706

UNITED STATES PATENT OFFICE 2,512,706

WATER-COOLED GAS-BLANKETED ARC WELDING TORCH

Nelson E. Anderson, Scotch Plains, N. J., assignor to Air Reduction Company, Incorporated, a corporation of New York Application March 18, 1948, Serial No. 15,520

8 Claims. (Cl. 219—15)

This invention relates to inert gas shielded arc welding, and more particularly to an improved electrode holder for use in the inert gas shielded arc welding field.

As is well known in the arc welding art, the inert gas shielded arc welding process is one in which an arc is struck between the work-piece and an electrode to produce the necessary welding heat, and an envelope of inert gas, usually helium or argon, is maintained around the arc and the weld puddle to prevent oxidation. Sometimes a depositing electrode of either the stick or the wire type is employed and is automatically fed toward the work as it is consumed. At other times a non-consuming electrode usually made of tungsten is employed.

An inert gas shielded arc welding process of the kind above described is applicable to both manual and machine welding operations. In a copending application Serial No. 782,102, filed jointly by George R. Turbett and myself on October 25, 1947, there is disclosed an electrode holder adapted for use in the inert gas shielded arc welding process and adapted to hold an electrode of the tungsten or other non-consuming type. While many of the features of the electrode holder disclosed in that application are applicable to either a machine type electrode holder or a manual type electrode holder, the particular electrode holder illustrated, and claimed in the more specific claims, is an electrode holder of the machine type. The present application relates to an electrode holder which is similar in many respects to the one disclosed in the copending application but appropriately modified to make it light in weight and to give it other characteristics which adapt it for manual welding.

The principal object of the invention is therefore to provide an improved manual electrode holder adapted for use in the inert gas shielded arc welding process and adapted to hold an electrode of the tungsten or other non-consuming type. However, some of the electrode holder's special features which were incorporated mainly with a view to making it an improved manual type electrode holder, may be useful nevertheless in a machine type electrode holder, and it is therefore an additional object of the invention to provide improved electrode holder features which are applicable to both types of holders.

A manual electrode holder embodying the invention is illustrated in the accompanying drawings, in which:

Figure 1 is a side elevation of the electrode holder shown in operating relation to a workpiece;

Fig. 2 is a vertical section of the electrode holder of Fig. 1;

Fig. 3 is a partial vertical section illustrating an accessory for use on the electrode holder when welding with long length electrodes;

The electrode holder of this invention comprises two main parts, namely, the handle portion and the barrel or body portion. The handle portion, in addition to serving as a hand grip, provides the necessary connection to the lead cable carrying the welding current, shielding gas, and cooling water, and also carries these three items down to the barrel portion. The barrel, in turn, provides means for gripping the electrode, distributing the shielding gas as required, and transferring the heat from the critical parts to the cooling water.

Figure 9:
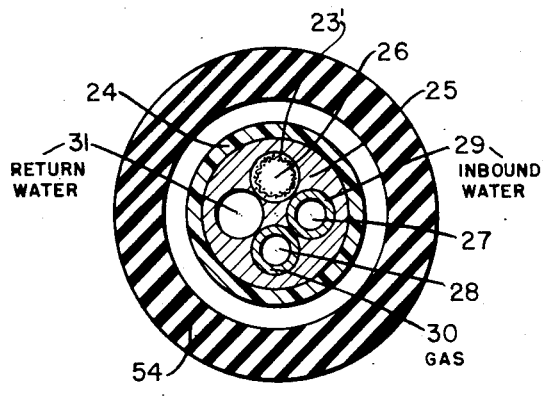
Fig. 9 is a transverse section taken along line 9—9 of Fig. 2.

Referring to the drawings, the lead cable 20 (Fig. 2) comprises a shielding gas supply tube 21 and a water supply tube 22 forming a twisted pair surrounded by a copper braid 23 serving as a current conductor which in turn is surrounded by an outer tube 24 which serves as a cooling water return conduit. This cable is claimed in a copending application Serial No. 782,898, filed jointly by Stephen L. Sullivan and myself on October 29, 1947, and therefore does not form part of this invention. However, an end block 25 in which the cable terminates does form part of the invention. This end block 25 is shown in transverse section in Fig. 9. It is circular in section and has four longitudinal holes drilled therein. One of these holes 26 is drilled only partially through the block and receives the end 23' of the braided copper conductor in the lead cable (Fig. 2). The block 25 is made of conducting material, preferably brass, and the end of the braided copper conductor is soldered into the hole 26. Holes 27 and 28 receive tubes 29 and 30, respectively (Figs. 2 and 9). These tubes project beyond both ends of the block 25 (Fig. 2), thereby permitting the ends of the lead cable flexible tubes 22 and 21, respectively, to be slipped over them and cemented to form a tight joint. The fourth hole 31 (Fig. 9) is drilled through the block and serves as a return cooling water port. The outer tubing 24 of the lead cable is slipped over the end block 25 and cemented in place as shown in Fig. 2, providing a sealed joint for conducting the return cooling water.

The lower end of the end block 25 has a shoulder 32 machined around its circumference to receive the end of a handle tube 33 to which it is hard soldered (Fig. 2). The opposite end of this tube 33 terminates in a connecting block 34 which forms the junction between the handle portion and the barrel portion of the electrode holder. The above-mentioned tubes 29 and 30, carrying the inbound cooling water and the inert shielding gas, respectively, pass through the interior of the handle tube 33 and also terminate in the connecting block 34.

Figure 5:
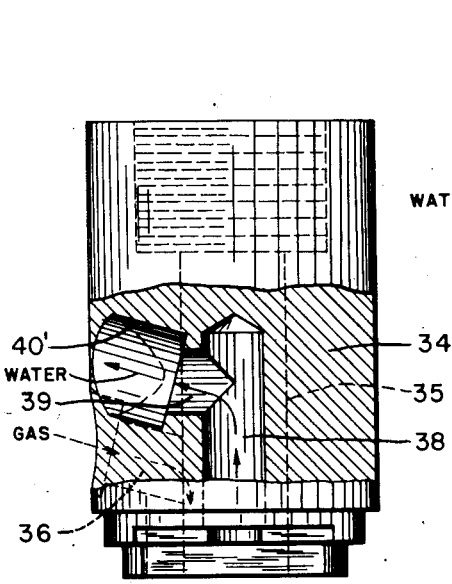
Fig. 5 is a side elevation, partially in section along the line 5—5 of Fig. 6, of the connecting block forming part of the electrode holder.
Figure 6:
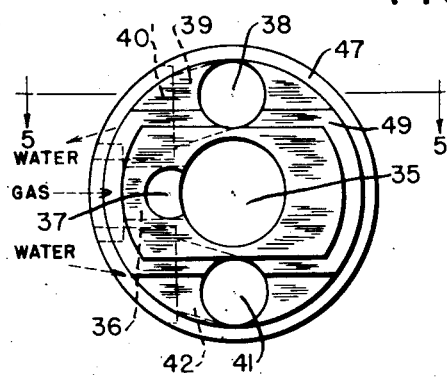
Fig. 6 is an end view of the bottom of the connecting block of Fig. 5.
Figure 4:
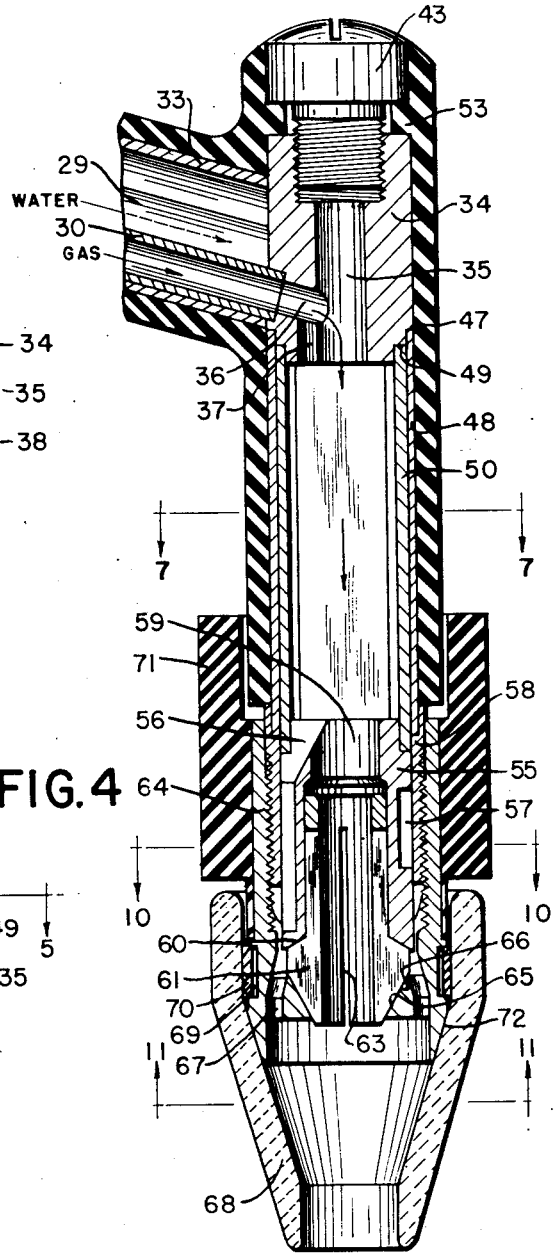
Fig. 4 is an enlarged vertical section of a portion of the electrode holder shown in Figs. 1 and 2.
Figure 8:
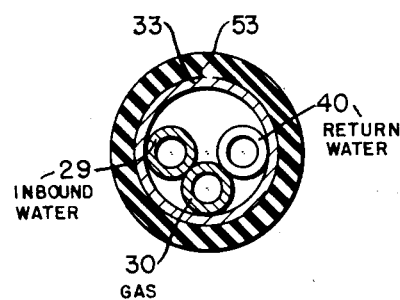
Fig. 8 is a transverse section taken along line 8—8 of Fig. 2.

The block 34 is shown in section through its center line in Fig. 2 and Fig. 4, and in Fig. 5 it is shown partially in section along the plane denoted 5—5 in Fig. 6. This block is circular in section and has three longitudinal holes drilled in it. One hole designated 35 is axial and is drilled entirely through the block. A radial hole 36 communicates with the axial hole 35 and is recessed at its outer end to receive the end of the shielding gas tube 30 which is hard soldered in the recess. An auxiliary port 37 (Fig. 4) adjoining part of the axial hole 35 is provided to furnish adequate passage of shielding gas when hole 35 is obstructed by a large diameter electrode. Longitudinal hole 38 (Figs. 5 and 6) drilled partially through the length of the block communicates through a port 39 with the end of a short length of tubing 40 (Fig. 8). The tubing 40 is hard soldered into a recess 40' in the block 34 at the end of the port 39 (Fig. 5). Tube 39 discharges directly into the interior of the handle tube 33. In addition to carrying the return cooling water, it serves as a guide to assist in the assembly of the electrode holder. Another longitudinal hole 41 and connecting port 42 (Fig. 6) carry the cooling water from the tube 29 in the handle into the barrel. The longitudinal hole 41 does not extend through the entire length of the block, however.

The axial electrode-receiving hole 35 is enlarged and tapped at its upper end to receive a plug 43 made of material that is a non-conductor of electricity, or a barrel extension 44 (Fig. 3). This barrel extension is used when the electrode is sufficiently long to extend beyond the intersection of the barrel and the handle when the electrode is held in normal operating position in the electrode holder. The extension comprises an inner tubular portion 45 having threads formed on one of its ends to screw into a threaded recess at the upper end of the axial hole 35 in the block 34, and an outer covering 46 of electric insulating material.

Figure 7:
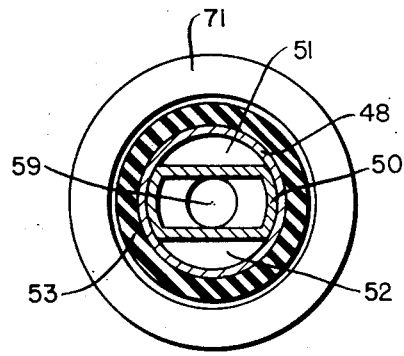
Fig. 7 is a transverse section taken along line 7—7 of Fig. 2 and Fig. 4.

The base of the connecting block 34 has a shoulder 47 cut around its circumference to receive the upper end of the main barrel tube 48 (Fig. 4). Another shoulder 49, having two straight and two arcuate sides receives the end of the inner barrel tube 50, which tube has the same sectional shape. The axial hole 35 and its auxiliary port 37 discharge into the interior of the inner tube 50. The arcuate sides of tube 50 fit snugly within the main barrel tube 48 (Fig. 7) so as to form two distinct and separated passages 51 and 52 between the flat sides of the inner tube 50 and the inside of the main barrel. The cooling water enters passage 51 from longitudinal hole 41 in the block 34. The cooling water return is through passage 52 into longitudinal hole 38 in the block 34. Any small leakage which might occur between passage 51 and passage 52 is unimportant as they are both water passages. With this construction there is no danger of water getting in the shielding gas.

The handle, connecting block 34, and barrel portions are insulated and protected by a cover 53 of non-conducting material such as ethyl cellulose (Figs. 1, 2 and 5). This provides electrical and thermal insulation. A handle portion 54 (Fig. 2) of insulating material screws onto threads on the handle end of the insulating cover 53. This covers the end block 25 and a portion of the lead cable 20, and is spaced from the block and cable.

Figure 10:
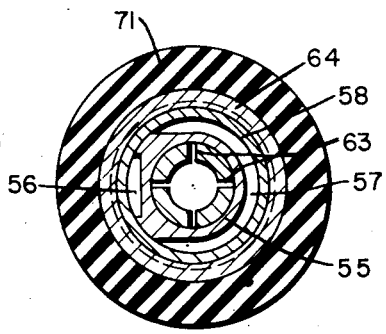
Fig. 10 is a transverse section taken along line 10—10 of Fig. 4.

The inner barrel tube 50 is connected at its lower end to a block 55 hereafter referred to as a collet holder (Fig. 4). The upper portion of this collet holder has two flat sides similar to tube 50, and it is circular in section at its lower end. A slot 56 is milled down the length of one of the arcuate sides. The two flat sides are connected by a slot 57 cut around the remaining arcuate side (see also Fig. 10). A cylindrical sleeve 58 is secured to the lower end of the main barrel tube 48 and fits over a large part of the collet holder 55 so that slots 56 and 57 form passages for gas and water respectively. A hole 59, whose diameter at the top may not exceed the minimum dimension of the inner tube 50, is drilled axially in the collet holder 55. Part way down its length this hole is enlarged to a greater diameter. The bottom edge of the hole is beveled to form a conical seat 60 for a collet 61. The bevel here is to provide greater surface area of contact as well as to assist, rather than hinder, the compression of the collet when the collet sleeve is tightened. This seat should form good contact with the collet to conduct the welding current to the electrode as well as to conduct the heat back to the cooling water.

The collet 61 is machined to fit up in the enlarged portion of the axial hole in the collet holder 55. It has a hole through the center of suitable diameter to receive an electrode 62 (Fig. 2) and has slots 63 (Figs. 4 and 10) cut at 90 degree intervals to form resilient collet jaws adapted to grip the electrode. The collet is changeable to permit the use of electrodes of various diameters, all the collets having the same outside dimensions but different inside diameters.

Figure 11:
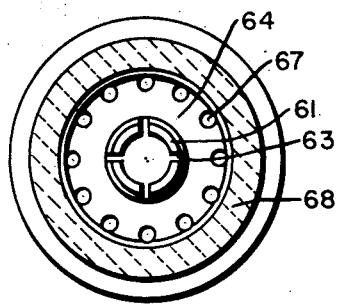
Fig. 11 is a transverse section taken along line 11—11 of Fig. 4.

A collet sleeve 64 (Fig. 4) has a cylindrical upper portion internally threaded to engage external threads on the sleeve 58. Its lower end is machined to form an internal conical surface 65 which engages external inwardly and downwardly tapered surfaces 66 on the lower ends of the collet jaws in such a manner that the jaws are squeezed closed on an electrode when the collet sleeve is screwed up on the sleeve 58. The collet sleeve and the collet therefore function like a chuck to grip the electrode. A number of gas ports 67 (see also Fig. 11) are drilled through the lower portion of the collet sleeve to pass the shielding gas down to a nozzle or gas cap 68. A slot 69 cut around the outside of the collet sleeve holds a clamping ring 70 which is a split ring of resilient material formed slightly out of round. A sleeve or ring of insulating material 71 is secured to the collet sleeve and affords means for turning the collet sleeve by hand.

The gas cap 68, formed of non-conducting refractory material, such as silicon carbide, is cylindro-conical in shape and seats on the conical end seat 72 of the collet sleeve 64. The clamping ring 70 is compressed and deformed to slide the gas cap 68 thereover, after which its tendency to expand retains the gas cap by friction.

The end block 25, tubes 29, 30 and 33, connecting block 34, tubes 48 and 50, collet holder 55 and sleeve 58, and collet sleeve 64 and collet 61 provide the electrical path for the welding current. The shielding gas is carried by tube 30, passages 36, 35 and 37 in the connecting block 34, tube 50, gas passage 56, collet sleeve ports 67, and gas cap 68. The cooling water enters by tube 29, passages 42 and 41 in the connecting block 34 and passage 51 in the barrel. The return water flow is via passage 52 in the barrel, passages 38 and 39 in the block 34, pipe 40, handle tube 33, and connecting block port 31.

The invention provides a very compact and lightweight manual electrode holder capable of carrying high welding currents and capable of providing good gas coverage. The entire electrode holder is well insulated, including adequate insulation against the large high frequency voltages employed for the stabilization of the arc in some welding operations.

I claim:

1. An electrode holder comprising a barrel portion and a handle portion disposed at an angle to each other, a metal connecting block at the intersection of the barrel and handle portions, the barrel portion including an outer cylindrical metal tube and an inner metal tube fitting within the outer tube and constituting a gas conduit and having two flat portions extending lengthwise of the tube to form with the wall of the outer tube two cooling water passages which extend longitudinally of the tubes, the upper ends of said tubes being connected to the lower portion of said connecting block, electrode-gripping means in the barrel portion near the lower end thereof and in electric conducting contact with said tubes, means placing the lower ends of said cooling water passages in communication in the vicinity of said electrode-gripping means, a gas nozzle mounted at the lower end of the barrel portion in coaxial relation with an electrode when one is held by the electrode-gripping means, means forming gas passages placing the lower end of said inner tube in communication with the interior of said nozzle, said handle portion including an outer water-conducting metal tube and an interior water-conducting metal tube and an interior gas-conducting metal tube all connected to said connecting block, said connecting block having a gas passage connecting said interior gas-conducting tube of the handle portion with the interior of said inner tube of the barrel portion and having a pair of independent water passages which connect each of the water-conducting tubes of the handle portion to one of said cooling water passages in the barrel portion, means for supplying water to one of the water-conducting tubes of the handle portion and discharging it from the other, means for supplying gas to said gas-conducting tube in the handle portion, and an electric conductor electrically connected to the tubes of the handle portion for supplying welding current to them which is conducted through said junction block and the tubes in the barrel portion to the electrode gripping means.

2. An electrode holder comprising a barrel portion and a handle portion disposed at an angle to each other, a metal connecting block at the intersection of the barrel and handle portions, the barrel portion including metal tubes connected at their upper ends to the connecting block and forming a gas passage and two cooling water passages extending longitudinally of the barrel portion, electrode-gripping means in the barrel portion near the lower end thereof and in electric conducting contact with said tubes, means placing the lower ends of said cooling water passages in communication in the vicinity of said electrode-gripping means, a gas nozzle mounted at the lower end of the barrel portion in coaxial relation with an electrode when one is held by the electrode-gripping means and the interior of which is in communication with said gas passage, said handle portion including an outer water-conducting metal tube and an interior water-conducting metal tube and an interior gas-conducting metal tube all connected to said connecting block, said block having passages which connect said interior gas-conducting tube to said gas passage in the barrel portion and each of said water-conducting tubes to one of the cooling water passages in the barrel portion, an end metal block to which the distal end of said outer tube of the handle portion is connected in a water-tight manner and through which the end portions of the two interior tubes of the handle portion pass, water supply and discharge tubes one of which is connected in a water-tight manner to said end block and the other of which is connected to the end of said interior water-conducting tube, the end block having a passage placing the outer water-conducting tube of the handle portion in communication with the water supply or discharge tube that is connected to the end block, a gas supply tube connected to the end of said interior gas-conducting tube of the handle portion, and an electric conductor electrically connected to said end block for supplying welding current to it.

3. An electrode holder comprising a barrel portion and a handle portion disposed at an angle to each other, a metal connecting block at the intersection of the barrel and handle portions, the barrel portion including metal tubes connected at their upper ends to the connecting block and forming a gas passage and two cooling water passages extending longitudinally of the barrel portion, electrode-gripping means in the barrel portion near the lower end thereof and in electric conducting contact with said tubes, means placing the lower ends of said cooling water passages in communication in the vicinity of said electrode-gripping means, a gas nozzle mounted at the lower end of the barrel portion in coaxial relation with an electrode when one is held by the electrode-gripping means and the interior of which is in communication with said gas passage, said handle portion including an outer water-conducting metal tube and an interior water-conducting metal tube and an interior gas-conducting metal tube all connected to said connecting block, said block having passages which connect said interior gas-conducting tube to said gas passage in the barrel portion and each of said water-conducting tubes to one of the cooling water passages in the barrel portion, an end metal block to which the distal end of said outer tube of the handle portion is connected in a water-tight manner and through which the end portions of the two interior tubes of the handle portion pass, a lead cable connected to said end block having an outer water-conducting tube housing a braided metal electric conductor and gas and water supply tubes, the outer tube of the cable being connected in a water-tight manner to the end block, the electric conductor being electrically connected to the end block, and the gas and water supply tubes of the cable being connected respectively to the ends of the interior gas-conducting tube and interior water-conducting tube of the handle portion, the end block having a passage placing the outer water-conducting tube of the handle portion in communication with the outer water-conducting tube of the lead cable.

4. An electrode holder comprising an electrically conductive body portion, a collet supported thereby having an axial opening to receive the electrode and resilient electrode-gripping jaws, a collet sleeve having threaded connection with the body portion, the collet jaws each having an external inwardly tapered surface and the collet sleeve having an internal inwardly tapered surface cooperating with the tapered surfaces on the collet jaws to force the jaws into gripping engagement with the electrode when the collet sleeve is screwed on the body portion, the collet sleeve also having at its lower end an external inwardly tapered conical surface, and a gas nozzle mounted on and surrounding a portion of the collet sleeve and having a conical interior surface seating on said external conical surface on the collet sleeve.

5. An electrode holder in accordance with claim 4 in which said nozzle is made of refractory material and is fixedly held to the collet sleeve by a split expansible ring engaging in a recess in the outer surface of the collet sleeve and exerting an expansive force outwardly against the inner surface of the nozzle.

6. An electrode holder comprising a body portion constituting a gas conduit which is electrically conductive, a collet supported by the body portion having an axial opening to receive the electrode and resilient electrode-gripping jaws, a collet sleeve having threaded connection with the body portion, the collet jaws each having an external inwardly and downwardly tapered surface and the collet sleeve having an internal conical surface cooperating with the tapered surfaces on the collet jaws to force the jaws into gripping engagement with the electrode when the collet sleeve is screwed on the body portion, and a gas nozzle mounted on and surrounding a portion of the collet sleeve, the wall of the collet sleeve radially outward of its internal conical surface having a plurality of holes drilled axially of the body portion of the electrode holder to admit gas from the interior of the collet sleeve to the interior of the gas nozzle.

7. An electrode holder comprising a barrel portion and a handle portion disposed at an angle to each other, a connecting block at the intersection of the barrel and handle portions, the barrel portion being connected to one side of the block and the handle portion being connected to a contiguous side of the block, electric insulation covering the barrel and handle portions and the connecting block, electrode-gripping means in the barrel portion, the barrel portion having means forming a gas passage for conducting gas to the vicinity of an electrode tip when an electrode is held in said electrode-gripping means and having means forming cooling-water passages for conducting cooling water to and from the vicinity of the electrode-gripping means, said handle portion having means forming a gas passage leading to said contiguous side of the block and having means forming cooling-water passages leading to said contiguous side of the block, one of the cooling-water passages of each of the handle and barrel portions being an inlet passage and the other passage of each of the handle and barrel portions being a discharge passage, said block having a plurality of angular passages respectively connecting the passages of the handle portion to the corresponding passages of the barrel portion, each of the block passages having one arm thereof extending axially of the barrel portion and communicating with a passage in the barrel portion and having a lateral arm communicating with a passage in the handle portion through said contiguous side of the block, and a nozzle at the lower end of the barrel portion and surrounding the tip of an electrode held in said electrode-gripping means.

8. An electrode holder in accordance with claim 7 in which the axially extending arm of one of the block passages is in coaxial relation with the electrode-gripping means and extends completely through the block and the electrode holder has a removable closure at the upper end of said last-mentioned arm.

NELSON E. ANDERSON.

REFERENCES CITED

The following references are of record in the file of this patent:

UNITED STATES PATENTS

| Number | Name | Date |
|--------|------|------|
| 1,707,433 | Hand | Apr. 2, 1929 |
| 2,014,226 | Catlett | Sept. 10, 1935 |
| 2,063,467 | Southgate | Dec. 8, 1936 |
| 2,376,265 | Meredith | May 15, 1945 |
| 2,468,804 | Breymeier | May 3, 1949 |
| 2,468,805 | Herbst | May 3, 1949 |
| 2,468,806 | Pilia | May 3, 1949 |
| 2,468,807 | Herbst | May 3, 1949 |
| 2,473,258 | Potter | June 14, 1949 |

OTHER REFERENCES

The Welding Journal, May 1947, page 411.